US009916348B1

(12) United States Patent
Madhavan et al.

(10) Patent No.: US 9,916,348 B1
(45) Date of Patent: Mar. 13, 2018

(54) ANSWER FACTS FROM STRUCTURED CONTENT

(71) Applicant: Google Inc., Mountain View, CA (US)

(72) Inventors: Jayant Madhavan, San Francisco, CA (US); Hongrae Lee, Mountain View, CA (US); Warren H. Y. Shen, San Jose, CA (US); Sreeram Viswanath Balakrishnan, Los Altos, CA (US)

(73) Assignee: Google LLC, Mountain View, CA (US)

( * ) Notice: Subject to any disclaimer, the term of this patent is extended or adjusted under 35 U.S.C. 154(b) by 363 days.

(21) Appl. No.: 14/824,538

(22) Filed: Aug. 12, 2015

Related U.S. Application Data (60) Provisional application No. 62/036,968, filed on Aug. 13, 2014.

(51) Int. Cl.
*G06F 7/00* (2006.01)
*G06F 17/30* (2006.01)

(52) U.S. Cl.
CPC ...... *G06F 17/3043* (2013.01); *G06F 17/3053* (2013.01); *G06F 17/30424* (2013.01); *G06F 17/30864* (2013.01)

(58) Field of Classification Search
CPC ................................................ G06F 17/30424
See application file for complete search history.

(56) References Cited

U.S. PATENT DOCUMENTS

| 7,181,447 | B2 | 2/2007 | Curtis |
| 7,844,598 | B2 | 11/2010 | Masuichi |
| 7,953,720 | B1 | 5/2011 | Rohde |
| 8,122,042 | B2 | 2/2012 | Pan |
| 8,145,617 | B1 | 3/2012 | Verstak |
| 8,380,713 | B2 | 2/2013 | Oh |
| 8,463,791 | B1 | 6/2013 | Bierner |
| 8,738,362 | B2 | 5/2014 | Ferrucci |

(Continued)

FOREIGN PATENT DOCUMENTS

WO   WO2012040674 A3   7/2012

OTHER PUBLICATIONS

Su et al., "Indexing Relational Database Content Offline for Efficient Keyword-Based Search," Stanford University, 2005, 13 pages.

(Continued)

*Primary Examiner* — Ajith Jacob
(74) *Attorney, Agent, or Firm* — Fish & Richardson P.C.

(57) ABSTRACT

In one aspect, a method includes receiving a query determined to be a question query that seeks an answer response and data identifying resources determined to be responsive to the query; identifying structured content set in a top-ranked subset of the resources, each structured content set being content arranged according to related attributes in one of the resources; for each identified structured content set, determining whether the query matches the structured content set based on terms of the query matching related attributes of the structured content set; selecting one of the structured content sets for which the query is determined to match; generating, from the selected structured content set, a structured fact set from the related attributes that matched the terms of the query; and providing the structured fact set with search results that identify the resources determined to be responsive to the query.

18 Claims, 7 Drawing Sheets

(56) References Cited

U.S. PATENT DOCUMENTS

| | | |
|---|---|---|
| 8,738,617 B2 | 5/2014 | Brown |
| 2006/0184517 A1* | 8/2006 | Anderson ......... G06F 17/30864 |
| 2006/0224582 A1 | 10/2006 | Hogue |
| 2007/0094285 A1* | 4/2007 | Agichtein ......... G06F 17/30398 |
| 2011/0047171 A1 | 2/2011 | Paparizos |
| 2012/0084293 A1 | 4/2012 | Brown |
| 2013/0262501 A1 | 10/2013 | Kuchmann-Beauger |
| 2014/0141399 A1 | 5/2014 | Agarwal |

OTHER PUBLICATIONS

Wu et al., "Corroborating Answers from Multiple Web Sources," Proceedings of the 10th International Workshop on Web and Databases, 2007, 6 pages.

* cited by examiner

Airlines Baggage Fees — 300

— 302

Airlines try to offset the cost of rising fuel prices. Many of the airlines charge excess baggage fees for checking one or more pieces of luggage. These fees are described in the following table. — 306

Airline Baggage Fees

| Airline | First Bag | Second Bag | Additional Bag | Overweight | Oversized | |
|---|---|---|---|---|---|---|
| Airline A | $25 | $30 | $50 | $25 | $15 | — 330 |
| Fly Fast | $25 | $30 | $40 | $50 | $5 | — 332 |
| Comfort | $25 | $25 | $30 | $30 | $35 | — 334 |
| Luxury Lines | $0 | $0 | $25 | $25 | $25 | — 336 |
| Cheap Wings | $25 | $30 | $40 | $50 | $75 | — 338 |
| Air Europe | $30 | $30 | $30 | $30 | $35 | — 340 |
| Air Japan | $35 | $35 | $40 | $35 | $35 | — 342 |

ANSWER FACTS FROM STRUCTURED CONTENT

CLAIM OF PRIORITY

This application claims priority under 35 USC § 119(e) to U.S. Patent Application Ser. No. 62/036,968, filed on Aug. 13, 2014 the entire contents of which are hereby incorporated by reference.

BACKGROUND

This specification relates to search engine query processing.

The Internet provides access to a wide variety of resources, such as image files, audio files, video files, and web pages. A search system can identify resources in response to queries submitted by users and provide information about the resources in a manner that is useful to the users.

Users of search systems are often searching for an answer to a specific question, rather than a listing of resources. For example, users may want to know what the weather is in a particular location, a current quote for a stock, the capital of a state, etc. When queries that are in the form of a question are received, some search engines may perform specialized search operations in response to the question format of the query. For example, some search engines may provide information responsive to such queries in the form of an "answer," such as information provided in the form of a "one box" to a question.

Some question queries are fact-seeking, and thus are well served by facts that are enumerated in structured data, such as a table of facts.

SUMMARY

In general, one innovative aspect of the subject matter described in this specification can be embodied in methods that include the actions of receiving a query determined to be a question query that seeks an answer response and data identifying resources determined to be responsive to the query and ordered according to a ranking, the query having query terms; identifying structured content set in a top-ranked subset of the resources, each structured content set being content arranged according to related attributes in one of the resources; for each identified structured content set, determining whether the query matches the structured content set based on terms of the query matching related attributes of the structured content set; selecting one of the structured content sets for which the query is determined to match; generating, from the selected structured content set, a structured fact set from the related attributes that matched the terms of the query; and providing the structured fact set with search results that identify the resources determined to be responsive to the query and being separate and distinct from the search results. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Multiple quality signals ensure that the search system obtains high precision matches. The system is able to provide unique results from structured sources without the need of human curation. The system can readily provide fact answers for various less-know properties of prominent entities, e.g., [Mongolia population density], [what is India's highest point], [French population growth rate], [Nebraska quarterback Heisman], etc.

Fact sets based on structured data can be provided in response fact-seeking question queries. By first identifying structured content in resources and processing subsets of the structured content, processing power required at query time are reduced, which, in turn, improves the technology area of search query processing. This also allows faster access to information most relevant to user searches, and in turn, improves user experiences. Additionally, this improves the likelihood that fact sets that directly answer informational needs are provided to users, and in turn, further improves users' experiences.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

A structured content processor receives a query determined to be a fact question query that seeks a factual response, and data identifying resources determined to be responsive to the query. The resources are ordered according to a ranking.

In some implementations, the structured content processor identifies structured content sets in a top-ranked subset of the resources. As used in this written description, the term "unstructured content" is content that is displayed in the form of text passages, e.g., such as an article, and that is not arranged according to a particular visual structure that emphasizes relations among data attributes. The term "structured content," on the other hand, is content that is displayed to emphasize relations among data attributes. Examples of structured content include lists, tables, and the like. Thus, while a resource may be structured as mark-up language, the usage of the terms "structured content" and "unstructured content" is with reference to the visual formatting of content for rendering, and with reference to whether the arrangement of the rendered content is in accordance with a set of related attributes, e.g., attributes defined by row and column types in a table, and where the content is listed in various cells of the table.

For each identified structured content set, the structured content processor determines whether the query matches the structured content set based on terms of the query matching related attributes of the structured content set. The matching determination can be based on the received query matching a template that has been generated for a structured content set, or based on a direct match of the received query to a structured content set.

The structured content processor then selects one of the structured content sets for which the query is determined to match, and an answer generator generates, from the selected structured content set, a structured fact set from the related attributes that matched the terms of the query. The search system provides the structured fact set with search results that identify the resources determined to be responsive to the query. The structured fact set is separate and distinct from the search results.

These features and addition features are described in more detail in the sections that follow.

Example Operating Environment

Figure 1:
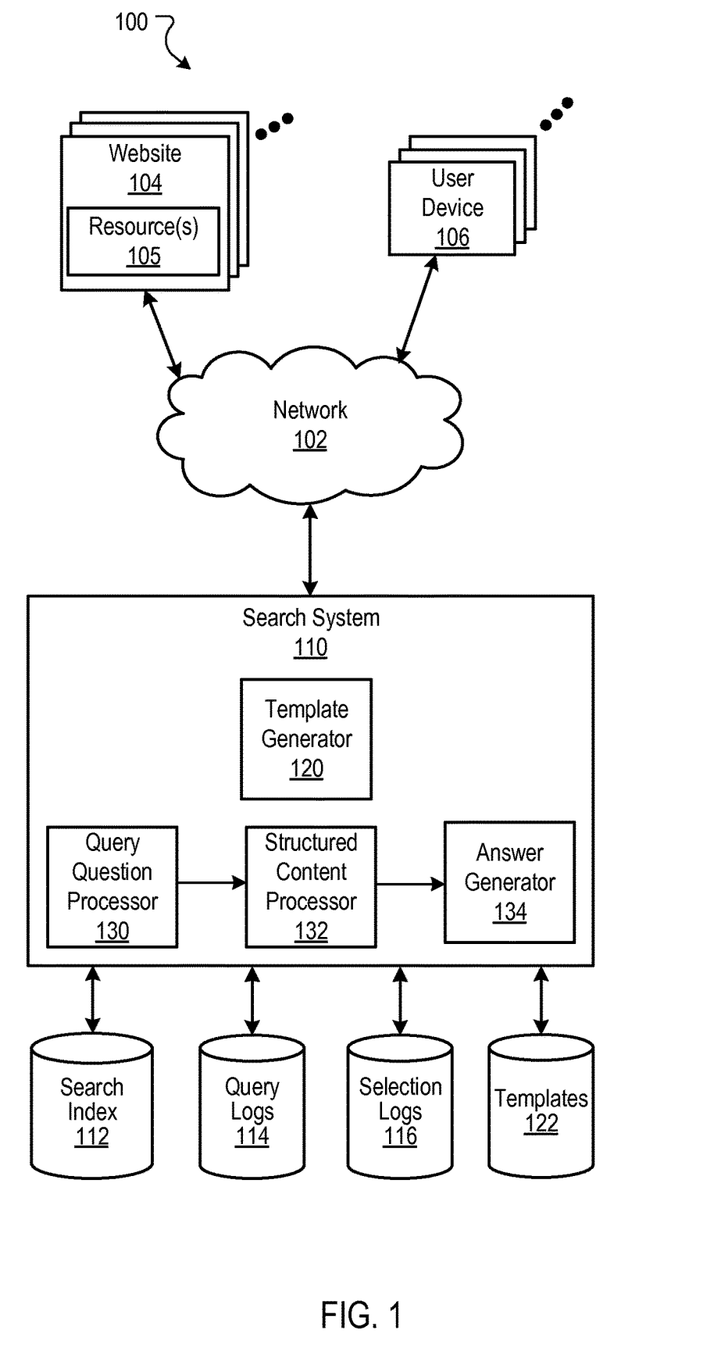
FIG. 1 is an illustration of an environment in which answer facts from structured content are provided with search results.

FIG. 1 is an illustration of an environment in which answer facts from structured content are provided with search results. A computer network 102, such as the Internet, connects publisher websites 104, user devices 106, and a search engine 110. The online environment 100 may include many thousands of publisher websites 104 and user devices 106.

A publisher website 104 includes one or more resources 105 associated with a domain and hosted by one or more servers in one or more locations. Generally, a website is a collection of web pages formatted in hypertext markup language (HTML) that can contain text, images, multimedia content, and programming elements, for example, scripts. Each website 104 is maintained by a content publisher, which is an entity that controls, manages and/or owns the website 104.

A resource is any data that can be provided by a publisher website 104 over the network 102 and that has a resource address, e.g., a uniform resource locator (URL). Resources may be HTML pages, electronic documents, image files, video files, audio files, and feed sources, to name just a few. The resources may include embedded information, e.g., meta information and hyperlinks, and/or embedded instructions, e.g., client-side scripts.

A user device 106 is an electronic device capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102. The web browser can enable a user to display and interact with text, images, videos, music and other information typically located on a web page at a website on the world wide web or a local area network.

To facilitate searching of these resources 105, the search engine 110 crawls the publisher websites 104 and indexes the resources provided by the publisher websites 104. The index data are stored in a resource index 112.

The user devices 106 submit search queries to the search engine 110. The search queries are submitted in the form of a search request that includes the search request and, optionally, a unique identifier that identifies the user device 106 that submits the request. The unique identifier can be data from a cookie stored at the user device, or a user account identifier if the user maintains an account with the search engine 110, or some other identifier that identifies the user device 106 or the user using the user device.

In response to the search request, the search engine 110 uses the index 112 to identify resources that are relevant to the queries. The search engine 110 identifies the resources in the form of search results and returns the search results to the user devices 106 in search results page resource. A search result is data generated by the search engine 110 that identifies a resource or provides information that satisfies a particular search query. A search result for a resource can include a web page title, a snippet of text extracted from the web page, and a resource locator for the resource, e.g., the URL of a web page.

The search results are ranked based on scores related to the resources identified by the search results, such as information retrieval ("IR") scores, and, optionally, a separate ranking of each resource relative to other resources (e.g., an authority score). The search results are ordered according to these scores and provided to the user device according to the order.

The user devices 106 receive the search results pages and render the pages for presentation to users. In response to the user selecting a search result at a user device 106, the user device 106 requests the resource identified by the resource locator included in the selected search result. The publisher of the website 104 hosting the resource receives the request for the resource from the user device 106 and provides the resource to the requesting user device 106.

In some implementations, the queries submitted from user devices 106 are stored in query logs 114. Selection data for the queries and the web pages referenced by the search results and selected by users are stored in selection logs 116. The query logs 114 and the selection logs 116 define search history data 117 that include data from and related to previous search requests associated with unique identifiers. The selection logs represent actions taken in response to search results provided by the search engine 110. Examples of such actions include clicks on the search results. The query logs 114 and selection logs 116 can be used to map queries submitted by user devices to resources that were identified in search results and the actions taken by users when presented with the search results in response to the queries. In some implementations, data are associated with the identifiers from the search requests so that a search history for each identifier can be accessed. The selection logs 116 and query logs 114 can thus be used by the search engine to determine the respective sequences of queries submitted by the user devices, the actions taken in response to the queries, and how often the queries have been submitted.

In some implementations, the search system 110 processes the selection logs and the query logs to determine navigational scores for the queries. A navigational score for a query is a measure of the query being navigational for a resource. Generally, the higher the navigational score for a query with respect to a resource, the more likely it is that users find that the resource satisfies the users' informational needs for that query and use the query to "navigate to" the resource. A particular query may have many navigational scores, each corresponding to a resource or website. The navigational score may be a binary score. For this scoring scheme, a score corresponding to a resource or website for which the query is navigational is set to 1. For all other resources and websites, the score is set to 0. This type of scoring model is based on the premise that a query is only navigational for one resource, or for one website.

Alternatively, the navigational score may be a score within an upper bound and a lower bound, and a query has a separate navigational score for each of multiple resources. In these implementations, an informational query may have a relatively flat score for many resources, indicating such resources are selected often for the query when identified by search results, and the score may gradually decrease to the lower bound for the remaining resources that are rarely selected for the query. Conversely, a query with a very high navigational score for only one resource is a navigational query for that one resource (or several resources belonging to a website). This latter scoring distribution is indicative of the query being used to find the one resource or website almost exclusively; in other words, the user "navigates" to the one resource or website by use of the query.

The navigational scores for the queries and corresponding resources are stored in the query logs 114 and may be accessed at query time to identify navigational scores of queries for resources, and to further identify queries that exhibit navigational behavior for one or more resources. For example, for a particular resource, each query having a navigational score that meets a navigational threshold may be considered to be navigational for that resource. In general, a resource or website may have multiple queries that exhibit navigational behavior. Likewise, a particular query may have a relatively high navigational score for several resources, or even resources that belong to different websites.

Answer Facts from Structured Content

As described above, some queries are in the form of question, or in the form of an implicit question. For example, the query [What are the excess baggage fees for Fly Fast airlines] is in the form of an explicit question. Likewise, the query question may be implied, as in the query [Fly Fast baggage fees]. The search system 110 includes a query question processor 130 that utilizes processes to determine if a query is a fact query question and, if so, to trigger the generation of a fact answer that is responsive to the query. The query question processor 130 can use a variety of different algorithms to determine whether a query is a question. For example, the query question processor 130 may utilize language models, machine learned processes, knowledge graphs, grammars, or combinations thereof to determine question queries and answers.

When the query is a fact question query, the query question processor 130 notifies the structured content processor 132, which, in turn, processes structured content from resources to select a particular set of structured content. The selected set of structured content is then processed by the answer generator 134 to generation the fact answer.

Figure 2:
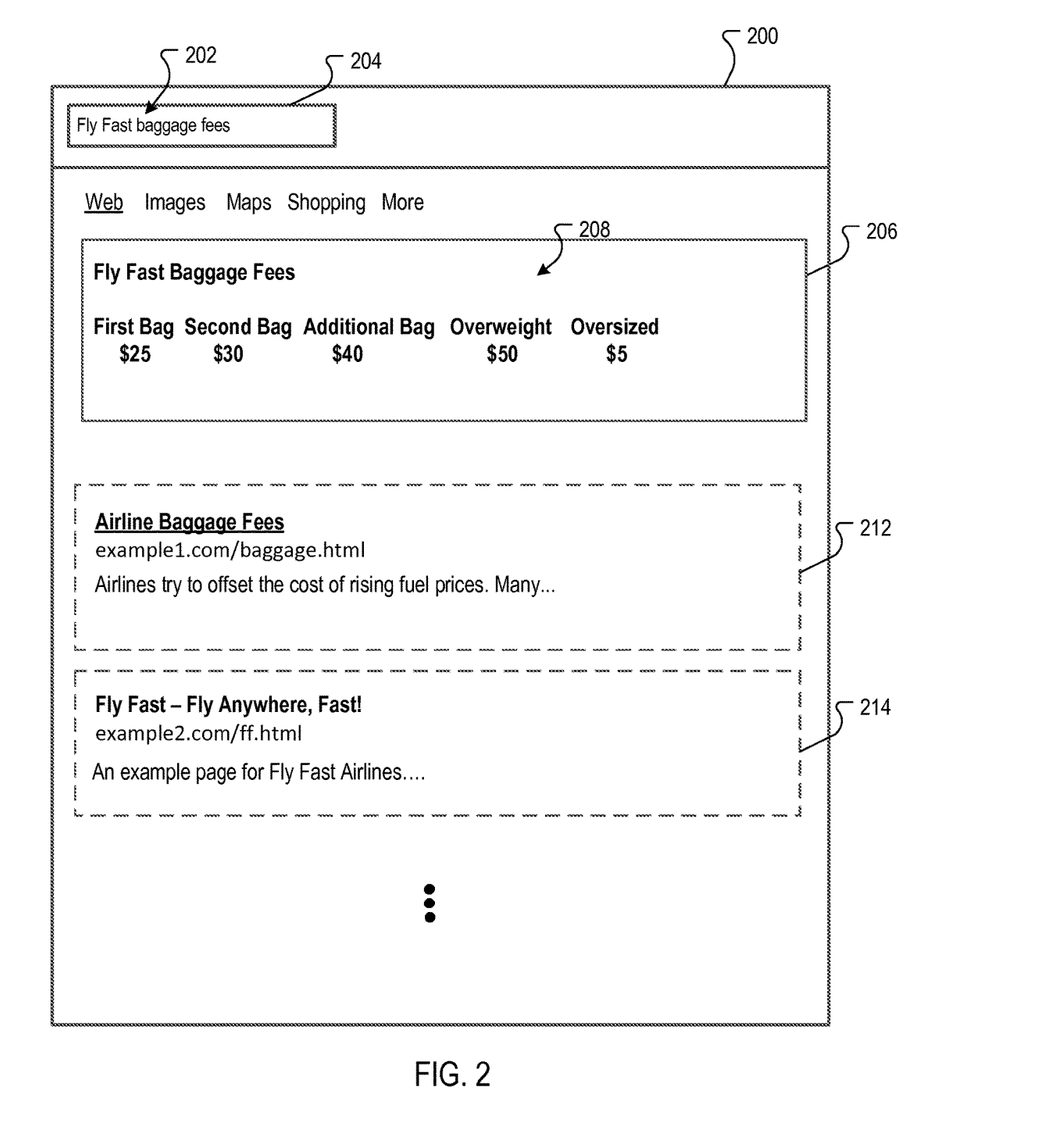
FIG. 2 is an illustration of a search results resource in which an answer generated from structured content is provided.

FIG. 2 is an illustration of a search results resource 200 in which fact answers are provided in response to a fact question query. The fact answer is generated from structured content. The query 202 [Fly Fast baggage fees] has been input in the input field 204. The query question processor 120 identifies the query as a fact question query, and invokes the structured content processor 132. The search system 110, in connection with the query question processor 130, provides an answer box 206 in response to the determination that the query is a fact question query and that a fact answer is generated. The answer box 206 includes the fact answer 208, which may include one or more relevant facts from the structured content. Additional information, such as search results 212 and 214, can also be provided on the search results page. The search results are separate and distinct from the fact answer 208.

Figure 3:
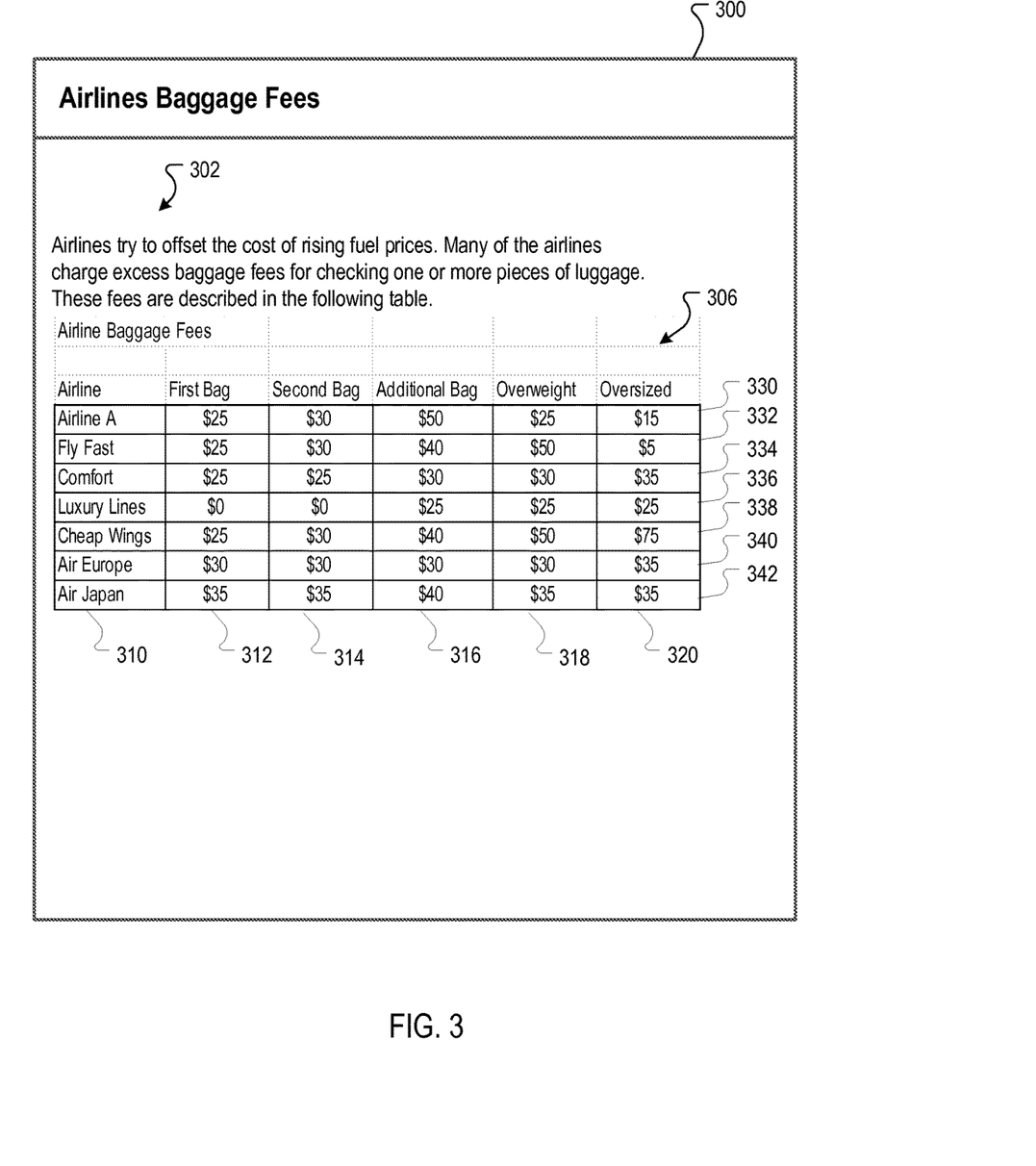
FIG. 3 is an illustration of a web page resource from which the answer of FIG. 2 was generated.

FIG. 3 is an illustration of web page resource 300 from which the answer passage of FIG. 2 was selected. The web page resource 300 also happens to be identified by the first search result 212. The web page resource 300 includes unstructured content 302 and structured content in the form of a table 306. The table includes columns 310-320 and rows 330-342. Column 310 corresponds to an airline attribute, and the remaining columns 312-320 correspond to various baggage fee attributes. Each row 330-342 corresponds to a particular airline. Each cell value expresses the relation between the corresponding airline and corresponding baggage fee in terms of a price value.

Structured Content Candidates

In some implementations, the structured content processor 132 identifies structured content in all resources that are determined to be responsive to the search query. A variety of appropriate processes can be used to identify structured content, such as mark-up language tag detection, formatting instructions, file identifiers, etc.

There are, however, many sets of structured content in resources, and many of these sets of structured content do not include information that is relevant to a query. For example, a table in a resource may be a navigational table that includes only hyperlinks to other resources. These types of tables are typically used to link users to information, but do not actually list the information. Thus, generating a fact answer from such a table is typically undesirable. Likewise, some tables may list facts that do not satisfy the informational need of many users, e.g., tables that list error codes resulting from a failed software compilation; tables that have attributes described in unrecognized formats, e.g., columns with alphanumeric designators only and only hexadecimal cell values; etc.

Thus, in some implementations, the structured content processor 132 is provided a list structured content candidates that have been previously identified as meeting a quality threshold. The list of structured content candidates can be provided by another subsystem in communication with the structured content processor 132. For example, a structured content classifier that has been trained to identify candidate structured content sets can be used to identify the structured content sets. The structured content processor 132 then processes only structured content sets listed as a structured content candidate.

Template Generation

In some implementations, the search system 110 includes a template generator 120 that generates templates for structured content. The templates are then used to match received queries to structured content at query time. In the example that follows, template generation for a table is described. However, templates for other types of structured content can also be used.

For a table, the template generator 120 attempts to build one or more query templates that capture the patterns of queries for which the table is likely to have quality fact answers. In some implementations, only queries that meet a minimum navigational score for the resource that includes the structured content are used to generate templates for the structured content. These queries are queries which users have repeatedly clicked on for that resource, and thus are indicative of both the quality of the resource and the responsiveness of the resource to the query.

Figure 4:
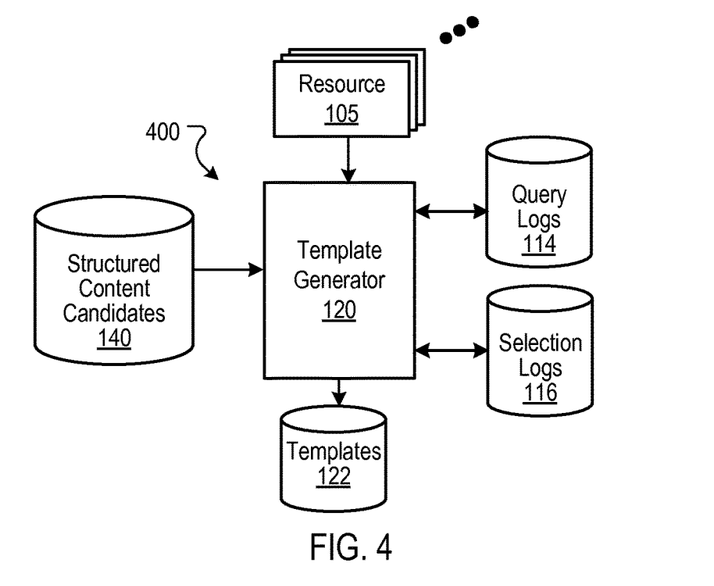
FIG. 4 is a system flow diagram illustrating a process for generating structured content templates.
Figure 5:
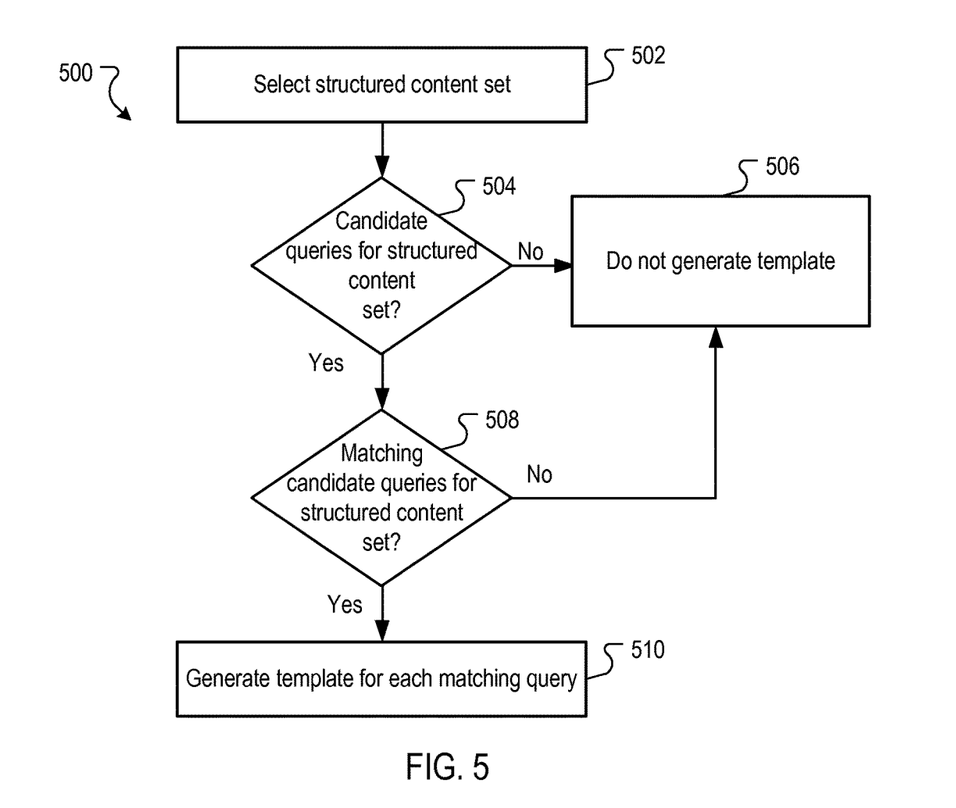
FIG. 5 is a flow diagram of an example process for generating structured content templates.

FIG. 4 is a system flow diagram 400 illustrating a process for generating structured content templates, and the system operation is also discussed with reference to FIG. 5, which is a flow diagram of an example process 500 for generating structured content templates. The process 500 is implemented in a data processing apparatus, such as one or more computers in a search system 110 and that are programmed to perform the operations of the template generator 120.

The template generator 120 selects a structured content set (502). For example, the template generator 120 may select a structured content set listed in the structured content candidates 140 data.

The template generator 120 determines whether there are candidate queries for the structured content set (504). For example, the template generator 120 may access the query logs 114 and selection logs 116 to determine which queries for the resource 105 that includes the selected structured content have navigational scores that meet a navigational score threshold.

If there are no candidate queries, e.g., there are no queries with scores that meet the navigational score threshold, then the template generator 120 does not generate a template (506). Conversely, if there are candidate queries, then the template generator 120, for each query, determines if the query matches the structured content set (508). For example, for each query, the template generator determines whether the query includes a term that defines at least one value of an attribute, and a term that matches an attribute of the structured content set. To illustrate, the query [Comfort baggage fees], which is a candidate query, has a value that matches the "Comfort" value in column 310, which is for the attribute "Airline." Likewise, the query also matches "baggage fees" in the title of the structured content. More generally, a term may match an attribute of a structured content set if it describes one (or more) of the attributes of the structured content set, or if it matches exactly an attribute name, such as a column name in a table. The template generator 120 then generates a template by substituting variable data for the matching value term. Thus, the template generator 120 generates the template:

[_column0_ baggage fees]

In some implementations, the template includes variable data, e.g., _column0_, corresponding to a set of values of an attribute in the structured content set, e.g., each airline name. The template also includes the invariable data describing at least one attribute in the structured content set, e.g., baggage fees. A query received at query time can then be "matched" to the template if the query is determined to include a term that defines at least one of the of values of an attribute, and terms that match an attribute of the structured content set. For example, the query [Fly Fast baggage fees] matches the template [_column0_ baggage fees].

In some implementations, at least a threshold number of queries (greater than 1) must match the structured content set before the template is generated. For example, if [Comfort baggage fees] is the only candidate query that matches, then no template is generated. However, if other queries, such as [Fly Fast baggage fees] and [Luxury Line baggage fees] also match, then the template is generated.

In some implementations, templates are scored based on the number of distinct candidate queries (such as queries with names of different airlines in this example) for the resource that match the template pattern. The score of the template can be used to determine whether to keep or discard a template, and can optionally be used in determining which structured content set to use when later constructing a fact answer.

By way of additional examples, other templates for the structured content set of FIG. 3 could include [_column0_ first bag fees], [overweight charges _column0_], and so on.

The invariable data corresponds to an answer. For example, for the template [_column0_ first bag fees], the answer would be column1, i.e., the "First Bag" column. Thus, in some implementations, the template may also include an answer identifier that may identify one or more answer facts, e.g.,

[_column0_ first bag fees]:_column1_ where the answer identifier "_column1_" specifies the column in the structured data in which the answer fact may be found.

The query templates for the candidate structured content for which the candidate queries are determined to match are then stored in the template store 122.

Processing Received Queries

At query time, when a query is received from a user device, the query is compared to the templates. A matching template indicates the structured content for that template may have a factual answer for the query. However, even if a template does not match a query, the structured content may, in some implementations, still be matched by a directing matching of the received query to the structured content. The processing of a received query, the matching techniques, and the generation of a fact answer are described with reference to FIGS. 6-9 below.

Figure 6:
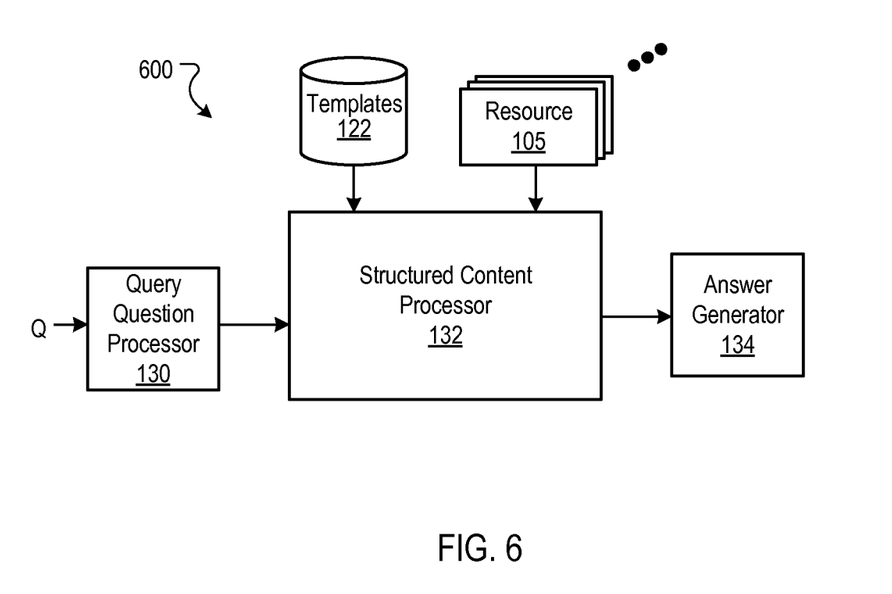
FIG. 6 is a system flow diagram illustrating a process for generating an answer from structured content.
Figure 7:
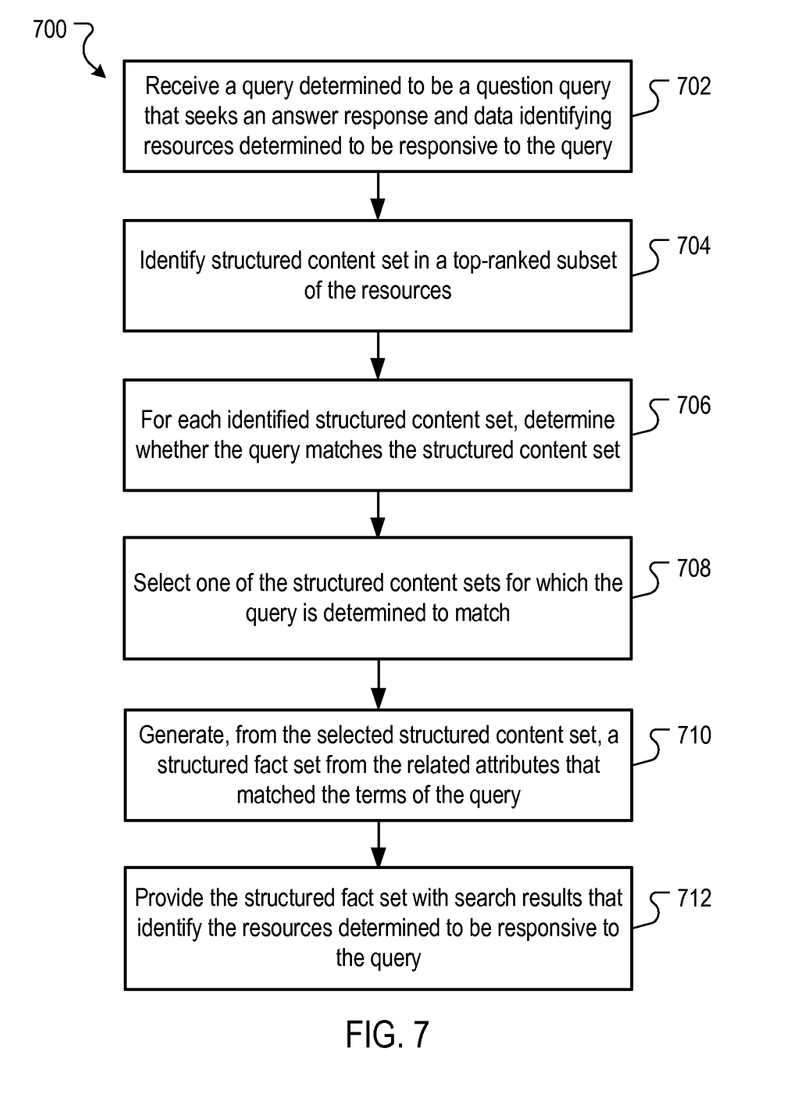
FIG. 7 is a flow diagram of an example process for generating an answer from structured content.

FIG. 6 is a system flow diagram illustrating a process 600 for generating an answer from structured content, the operation of which is described with reference to FIG. 7, which is a flow diagram of an example process 700 for generating an answer from structured content. The process 700 is implemented in a data processing apparatus, such as one or more computers in a search system 110 and that are programmed to perform the operations of the structured content processor 132 and the answer generator 134.

The structured content processor 132 receives a query determined to be a question query that seeks an answer response, and data identifying resources determined to be responsive to the query (702). For example, the structured content processor 132 receives a query processed by the search system 110, and data identifying responsive resources 105. The resources are ranked according to corresponding search scores generated by the search system 110.

The structured content processor 132 identifies structured content in a top-ranked subset of the resources (704). For example, the structured content processor 132 only processes the structured content listed in the structured content candidates 140 and also included in the top N ranked resources. This further reduces processing resources without sacrificing quality, as the most relevant content is typically provided in the top N resources. The value of N can be, for example, equal to the number of search results provided in a first search results page. Other values of N can also be used; alternatively, all resources determined to be responsive to the query can be processed.

The structured content processor 132, for each identified structured content set, determines whether the query matches the structured content set (708). The query may match a structured content set by a template match, or by a direct match. Matching by a template is described with reference to FIG. 8, and direct matching is described with reference to FIG. 9, to which we now turn.

Figure 8:
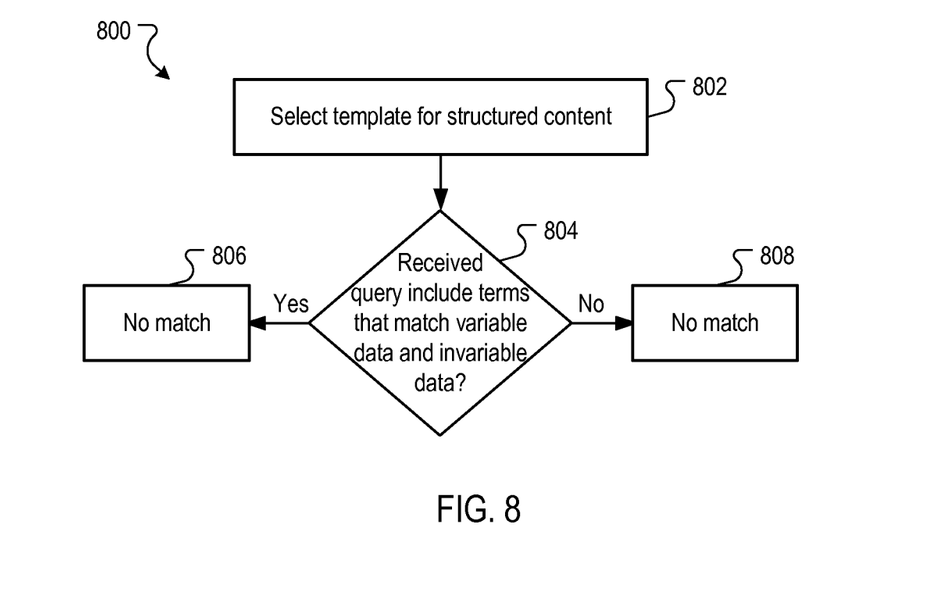
FIG. 8 is a flow diagram of an example process for matching a query to a structured content template.

With respect to template matching, FIG. 8 is a flow diagram of an example process 800 for matching a query to a structured content template. First, the structured content processor 132 selects a template for the structured content (802). For example, for the structured content set of FIG. 3, the templates described above may be selected.

The structured content processor 132 determines whether the received query includes terms that match the variable data and the invariable data (804). For example, the query [Fly Fast baggage fees] includes terms that match the template [_column0_ baggage fees]. In particular, the structured content processor 132 determines, from the structured content 306, that a column value of column 310 is "Fly Fast." Thus, the variable data column0_ consumes the query terms "Fly Fast." Likewise, the invariable data "baggage fees" consumes the same query terms "baggage fees," and thus the query is a match to the template (806). Otherwise, had the query not parsed, the query would not match the template (808).

In some implementations, a query need not be entirely consumed by a template. For example, stop words or interrogatives in the query can be removed or ignored. Thus, for the query [What are the Fly Fast baggage fees], the terms "What are the" are ignored during template matching.

In the case of a long tail query, there may not be a corresponding template that parses the query. In some implementations, if there is no template match, the structured content processor 132 may optionally check for a direct match of the received query to the structured content set.

For example, for the query [Airline baggage fees for additional bags for Air Japan], there may not be a template that consumes the query. However, if the query still has terms that match a row and a column in the table, it may be a match. In some implementations, a query matches a row if it includes terms that specify a cell value in a subject column for the structured content. The subject column, in general, provides unique identifiers for a row, e.g., the Airline column 310 in the structured content 306. Similarly, the query matches a column, which is referred to in direct matching as the answer column, if the query includes terms that are the name of the column. In some implementations, to increase coverage, the structured content processor also can count a column match when the query includes an n-gram, e.g., a bigram that is also a bigram in one of the columns.

In some implementations, to reduce false positive matches, any remaining terms in the query that are not matched must either be stop words, or must be words in a title of either the resource or the structured data, if such a latter title is specified.

Figure 9:
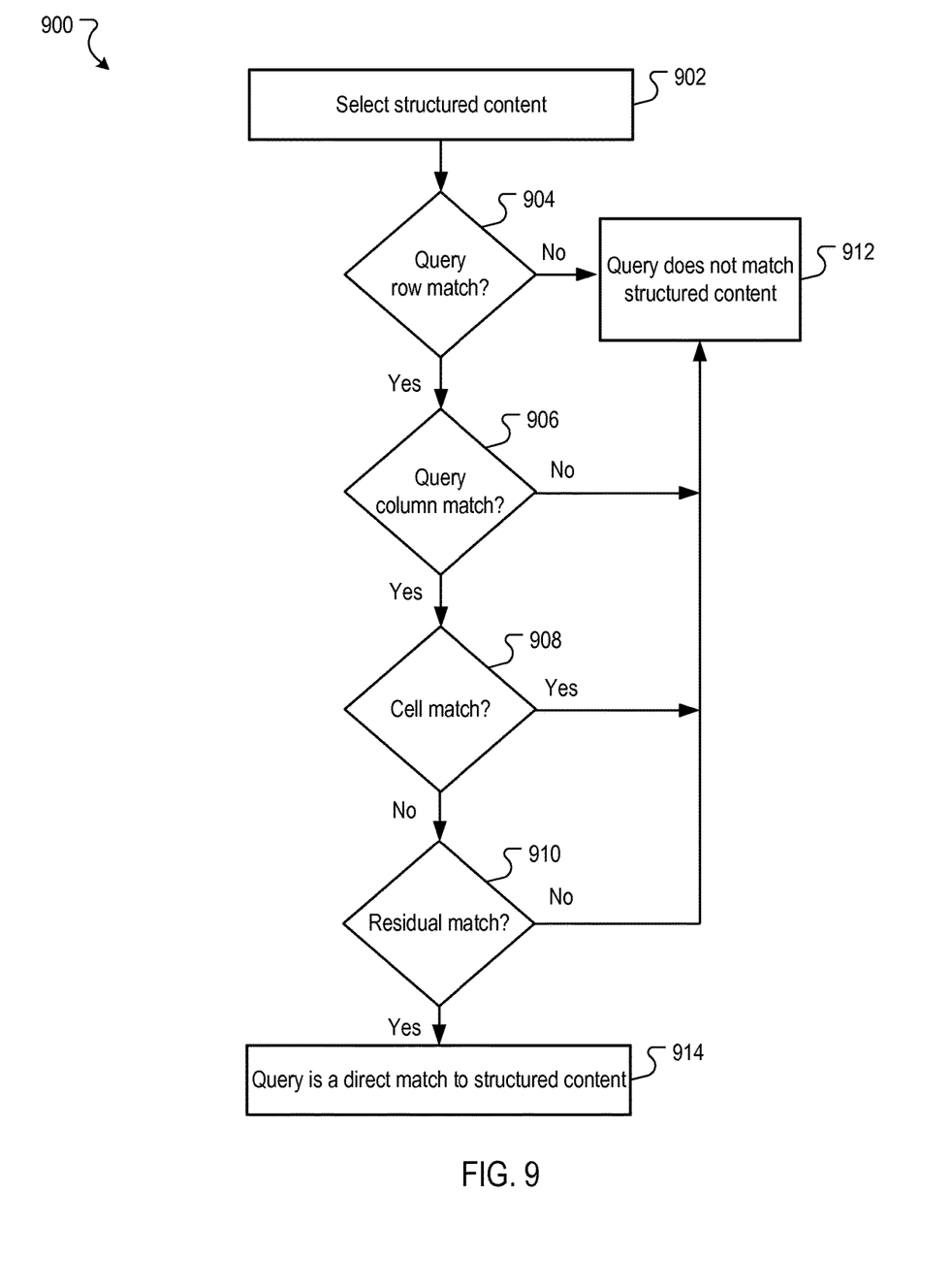
FIG. 9 is a flow diagram of an example process for direct matching of a query to structured content.

FIG. 9 is a flow diagram of an example process 900 for matching a query to structured content. The structured content processor 132 selects the structured content (902), and then determines in there is a query row match (904). For example, the query [Airline baggage fees for additional bags for Air Japan] includes "Air Japan", which matches a row value in the column 310, and thus there is a row match.

If there is no row match, then the query does not match the structured content (912). However, if there is a query row match, the structured content processor 132 then determines whether there is a query column match (906). For example, the query includes "additional bags" which is determined to be a match to the column name "Additional Bag."

If there is no column match, then the query does not match the structured content (912). However, if there is a query column match, the structured content processor 132 then determines whether there is a cell match (908). The cell match requires that the cell of the row match be in a different column that the cell of the column match.

If there is a cell match, then the query does not match the structured content (912). However, if there is not a cell match match, the structured content processor 132 then determines whether there is a residual match (910). The residual match, in some implementations, requires that all remaining terms be stop words, or must be words in a title of either the resource or the structured data, if such title is specified. Here, the remaining terms satisfy the residual match, and thus the query is a direct match to the structured content (914).

Had there not been a residual match, then the query would not match the structured content (912). For example, had the query been [customer complaints airline baggage fees for additional bags for Air Japan], the query would match column and rows, but the terms "customer complaints" would preclude a residual match.

Returning now to FIG. 7, assume that several structured content sets are determined to match the query—either by templates, direct matching, or both. The structured content processor 132 selects one of the structured content sets for which the query is determined to match (708). Any appropriate selection process can be used. For example, in some implementations, the matching structured content set from the highest ranked resource can be selected. In other implementations, a match score that is based on the score of matching templates of each structured content set can be used to select the structured content set. Other selection techniques can also be used.

The answer generator 134 generates, from the selected structured content set, a structured fact set from the related attributes that matched the terms of the query (710). In some implementations, the answer generator selects the attribute value of the cell corresponding to the attribute value of the row that matched the query, and selects a value in a cell that corresponds to the column corresponding to the matched column name. For example, for the query [Fly Fast Additional Bag Fee], the data selected may result in a sub-table as follows:

| Airline | Additional Bag |
|---------|----------------|
| Fly Fast | $40 |

In other implementations, the entire row (or rows, if multiple row values were specified in the query), may be selected. For example, for the query [Baggage fees Fly Fast and Air Japan], the following structured fact set may be generated:

| Airline | First Bag | Second Bag | Additional Bag | Overweight | Oversized |
|---------|-----------|------------|----------------|------------|-----------|
| Fly Fast | $25 | $30 | $40 | $50 | $5 |
| Air Japan | $35 | $35 | $40 | $35 | $35 |

If display space is limited, e.g., such as on a mobile device, and a particular column value is not specified, then the answer generator 134 generates data from the first columns until a size limit is met. For example, for the query [Fly Fast baggage fees] received from a mobile device, the following structured fact set may be generated:

| Airline | First Bag | Second Bag |
|---------|-----------|------------|
| Fly Fast | $25 | $30 |

The search system 110 provides the structured fact set with search results that identify the resources determined to be responsive to the query (712). For example, the search system provides the search results page 200 of FIG. 2, which includes the fact answer 208.

Additional Implementation Details

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving a query determined to be a question query that seeks an answer response and data identifying resources determined to be responsive to the query and ordered according to a ranking, the query having query terms;
   identifying structured content sets in a top-ranked subset of the resources, each structured content set being content arranged according to related attributes in one of the resources;
   for each identified structured content set, determining whether the query matches the structured content set based on terms of the query matching related attributes of the structured content set, the determining comprising:
      accessing one or more query templates for the structured content set, the query template including variable data corresponding to a plurality values of an attribute in the structured content set, and the invariable data describing at least one attribute in the structured content set; and
      determining that the query matches the structured content set when the query includes a term that define at least one of the plurality of values to which the variable data corresponds, and terms that match the invariable data;
   selecting one of the structured content sets for which the query is determined to match; and
   generating, from the selected structured content set, a structured fact set from the related attributes that matched the terms of the query; and
   providing the structured fact set with search results that identify the resources determined to be responsive to the query and being separate and distinct from the search results.

2. The method of claim 1, wherein the structured content set is a table having columns and rows, and wherein the variable data corresponds to a plurality of column values.

3. The method of claim 2, wherein generating, from the selected structured content set, a structured fact set from the related attributes that matched the terms of the query comprises:
   selecting the value of the plurality of values to which the variable data corresponds and defined by the term of the query; and
   selecting a value in a cell that corresponds to a column matched by the invariable data and a row in which the selected value is located, wherein the cell of the selected value is different from the cell that corresponds to the column matched by the invariable data.

4. The method of claim 1, further comprising:
   determining a set of queries for the structured content set;
   for each query, determining whether the query includes a term that defines at least one of a plurality of values of an attribute, and terms that match an attribute of the structured content set; and for each query determined to include a term that defines at least one of a plurality of values of an attribute and terms that match an attribute of the structured content set, generating a query template for the structured content set by replacing the term that defines at least one of a plurality of values of an attribute with variable data.

5. The method of claim 4, wherein determining a set of queries for the structured content set comprises determining a set of queries for which each query has a navigational score that meets a navigational score threshold, the navigational score for the query being a measure of the query exhibiting navigational behavior for the resource in which the structured content set is included.

6. The method of claim 1, wherein:
the structured content set is a table having columns and rows; and
determining whether the query matches the structured content set based on terms of the query matching related attributes of the structured content set comprises:
 determining whether the query includes terms that match attributes of a row; and
 determining whether the query includes terms that match attributes of a column.

7. The method of claim 6, wherein:
determining whether the query includes terms that match attributes of a row comprises determining whether the query includes a term that is an attribute value of a row; and
determining whether the query includes a term that match attributes of a column comprises determining whether the query includes a term matches a column name.

8. The method of claim 7, wherein determining whether the query matches the structured content set based on terms of the query matching related attributes of the structured content set comprises further comprises:
 determining whether a cell corresponding to the attribute value of a row is in a column different from the column corresponding to the matched column name.

9. The method of claim 8, wherein generating, from the selected structured content set, a structured fact set from the related attributes that matched the terms of the query comprises:
 selecting the attribute value of the cell corresponding to the attribute value of the row; and
 selecting a value in a cell that corresponds to the column corresponding to the matched column name.

10. A system, comprising:
a data processing apparatus; and
a memory storage system in data communication with the data processing apparatus and storing instructions executable by the data processing apparatus and that upon such execution cause the data processing apparatus to perform operations comprising:
 receiving a query determined to be a question query that seeks an answer response and data identifying resources determined to be responsive to the query and ordered according to a ranking, the query having query terms;
 identifying structured content sets in a top-ranked subset of the resources, each structured content set being content arranged according to related attributes in one of the resources;
 for each identified structured content set, determining whether the query matches the structured content set based on terms of the query matching related attributes of the structured content set, the determining comprising:
  accessing one or more query templates for the structured content set, the query template including variable data corresponding to a plurality values of an attribute in the structured content set, and the invariable data describing at least one attribute in the structured content set; and
  determining that the query matches the structured content set when the query includes a term that define at least one of the plurality of values to which the variable data corresponds, and terms that match the invariable data;
 selecting one of the structured content sets for which the query is determined to match; and
 generating, from the selected structured content set, a structured fact set from the related attributes that matched the terms of the query; and
 providing the structured fact set with search results that identify the resources determined to be responsive to the query and being separate and distinct from the search results.

11. The method of claim 10, wherein the structured content set is a table having columns and rows, and wherein the variable data corresponds to a plurality of column values.

12. The system of claim 11, wherein generating, from the selected structured content set, a structured fact set from the related attributes that matched the terms of the query comprises:
 selecting the value of the plurality of values to which the variable data corresponds and defined by the term of the query; and
 selecting a value in a cell that corresponds to a column matched by the invariable data and a row in which the selected value is located, wherein the cell of the selected value is different from the cell that corresponds to the column matched by the invariable data.

13. The system of claim 10, the operations further comprising:
 determining a set of queries for the structured content set;
 for each query, determining whether the query includes a term that defines at least one of a plurality of values of an attribute, and terms that match an attribute of the structured content set; and
 for each query determined to include a term that defines at least one of a plurality of values of an attribute and terms that match an attribute of the structured content set, generating a query template for the structured content set by replacing the term that defines at least one of a plurality of values of an attribute with variable data.

14. The system of claim 13, wherein determining a set of queries for the structured content set comprises determining a set of queries for which each query has a navigational score that meets a navigational score threshold, the navigational score for the query being a measure of the query exhibiting navigational behavior for the resource in which the structured content set is included.

15. The system of claim 10, wherein:
the structured content set is a table having columns and rows; and
determining whether the query matches the structured content set based on terms of the query matching related attributes of the structured content set comprises:

determining whether the query includes terms that match attributes of a row; and determining whether the query includes terms that match attributes of a column.

16. The system of claim 15, wherein:

determining whether the query includes terms that match attributes of a row comprises determining whether the query includes a term that is an attribute value of a row; and determining whether the query includes a term that match attributes of a column comprises determining whether the query includes a term matches a column name.

17. The system of claim 16, wherein determining whether the query matches the structured content set based on terms of the query matching related attributes of the structured content set comprises further comprises:

determining whether a cell corresponding to the attribute value of a row is in a column different from the column corresponding to the matched column name.

18. A non-transitory memory storage system storing instructions executable by a data processing apparatus and that upon such execution cause the data processing apparatus to perform operations comprising:

receiving a query determined to be a question query that seeks an answer response and data identifying resources determined to be responsive to the query and ordered according to a ranking, the query having query terms;

identifying structured content sets in a top-ranked subset of the resources, each structured content set being content arranged according to related attributes in one of the resources;

for each identified structured content set, determining whether the query matches the structured content set based on terms of the query matching related attributes of the structured content set, the determining comprising:

accessing one or more query templates for the structured content set, the query template including variable data corresponding to a plurality values of an attribute in the structured content set, and the invariable data describing at least one attribute in the structured content set; and determining that the query matches the structured content set when the query includes a term that define at least one of the plurality of values to which the variable data corresponds, and terms that match the invariable data;

selecting one of the structured content sets for which the query is determined to match; and generating, from the selected structured content set, a structured fact set from the related attributes that matched the terms of the query; and providing the structured fact set with search results that identify the resources determined to be responsive to the query and being separate and distinct from the search results.

* * * * *